US008768376B2

(12) United States Patent
Sun

(10) Patent No.: US 8,768,376 B2
(45) Date of Patent: Jul. 1, 2014

(54) METHOD FOR ACQUIRING ADJACENT ENB INFORMATION AND MOBILE MANAGEMENT ENTITY

(75) Inventor: Lianqiao Sun, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 34 days.

(21) Appl. No.: 13/257,765

(22) PCT Filed: Apr. 21, 2010

(86) PCT No.: PCT/CN2010/071956
§ 371 (c)(1),
(2), (4) Date: Feb. 3, 2012

(87) PCT Pub. No.: WO2011/020335
PCT Pub. Date: Feb. 24, 2011

(65) Prior Publication Data
US 2012/0196617 A1  Aug. 2, 2012

(30) Foreign Application Priority Data
Aug. 19, 2009 (CN) .......................... 2009 1 0168573

(51) Int. Cl.
*H04W 64/00* (2009.01)
(52) U.S. Cl.
USPC ...................................... 455/456.1; 455/552
(58) Field of Classification Search
USPC ............................ 455/444, 456.1–456.6, 522
See application file for complete search history.

(56) References Cited

U.S. PATENT DOCUMENTS

2009/0111503 A1* 4/2009 Pedersen et al. ............... 455/522
2010/0039991 A1* 2/2010 Godin et al. .................. 370/328

FOREIGN PATENT DOCUMENTS

CN    101242353 A    8/2008
CN    101370249 A    2/2009

OTHER PUBLICATIONS

International Search Report for PCT/CN2010/071956 dated Jul. 19, 2010.

* cited by examiner

*Primary Examiner* — Myron K Wyche
(74) *Attorney, Agent, or Firm* — Ling Wu; Stephen Yang; Ling and Yang Intellectual Property

(57) ABSTRACT

A method and system for acquiring information of a neighbor eNB are disclosed. The method includes: in a process of an evolved node B (eNB) establishing an S1 interface connection with a Mobility Management Entity (MME), the MME sends information of a global eNB ID and a tracking area identity (TAI) of the neighbor eNB of the eNB to the eNB; the eNB receives and acquires the information of the global eNB ID and the TAI of the neighbor eNB. With the present invention, the operators are free from the tedious work of manually configuring the information of the neighbor eNB, and frequent interactions between the UE and the eNB for the neighbor cell detection can be reduced.

9 Claims, 3 Drawing Sheets

METHOD FOR ACQUIRING ADJACENT ENB INFORMATION AND MOBILE MANAGEMENT ENTITY

TECHNICAL FIELD

The present invention relates to a Long Term Evolution (LTE) system, and more especially, to a method and system for acquiring neighbour E-UTRAN Node B (eNB) information.

BACKGROUND OF THE RELATED ART

In the LTE system, the method for automatically acquiring transmission address information of an opposite eNB and establishing an X2 interface connection is as follows, as shown in FIG. 1.

In step 101, an eNB1 acquires information of a Global eNB ID and a tracking area identity (TAI) of an eNB2, and the eNB1 sends an eNB Configuration Transfer message to a Mobile Management Entity (MME), in which information of the eNB1 is filled into a Source eNB-ID and the information of the eNB2 is filled into a Target eNB-ID, and self-organized network (SON) information is selected as a SON Information Request.

In step 102, after the MME receives this message, it judges that the type of the SON Information is the SON Information Request, then the MME transmits this message transparently to the eNB2 at a target side, wherein the name of the message is an MME Configuration Transfer message.

In step 103, after the eNB2 receives this message, it organizes and sends an eNB Configuration Transfer message to the MME, in this message the SON Information is selected as a SON Information Reply, and an IP address and a port number, which are used to connect with an X2 interface of the eNB1 at a source side, are filled into the SON Information Reply.

In step 104, after the MME receives the message, it judges that the SON Information is the SON Information Reply, then the MME transfers this message transparently to the eNB1 at the source side, wherein the name of the message is the MME configuration transfer message; after the eNB1 at the source side receives this message, it acquires the IP address and the port number of the X2 interface connection of the eNB2 at the target side, and then a coupling can be established on a Stream Control Transmission Protocol (SCTP) layer.

At present, there are two methods about how to acquire the information of an opposite party so as to acquire the IP address:
1. by a background configuration;
2. by an Automatic Neighbour Relation (ANR) function.

The ANR function is described briefly below.

The ANR function is located within the eNB and manages a Neighbour Relation Table (NRT) in concept. The ANR function includes a neighbour cell detection function that is able to discover a new neighbour cell and add it into the NRT. The ANR function also includes a neighbour cell deletion function that is able to delete the expired neighbour relation. Both the neighbour cell detection function and the neighbour cell deletion function belong to the content implemented by the manufacturers.

The Neighbour Cell Relation (NR) defined in the ANR is as follows:

The NR existing between a serving cell and a target cell means that a source cell controlled by the eNB knows an E-UTRAN Cell Global Identifier (ECGI)/a Cell Global Identifier (CGI) and a Physical Cell Identifier (PCI) of the target cell; the source cell has records for the source cell identifying the target cell in the NRT; and the source cell contains attributes defined in the NRT, and the attributes can be set by an Operation, Administration and Maintenance (OAM) function or be directly configured to default attribute values.

For each cell in the eNB, the eNB maintains and manages the corresponding NRT table, and for each NR, the NRT contains the Target Cell ID (TCI). For an E-UTRAN cell, the TCI represents ECGI and PCI of an E-UTRAN target cell.

Automatic neighbour cell generation and optimization is divided into the following two scenarios:
1) Intra-LTE/frequency Automatic Neighbour Relation Function;
2) Inter-RAT/Inter-frequency Automatic Neighbour Relation Function.

The solution for the first scenario is as follows.

The realization of the ANR function is shown in FIG. 2.

In step 201, a serving cell A of an eNB has an ANR function and acts as a part of a normal call flow, and the eNB notifies each user equipment (UE) to measure neighbour cells; wherein the eNB can use different strategies to notify the UE to perform measurement and when to report a measurement result.

In step 202, the UE sends the measurement result related to a cell B, where this result includes a PCI instead of an ECGI of the cell B; when the eNB receives a measurement report containing the PCI sent by the UE, proceed to the next step.

In step 203, the eNB notifies the UE to read the ECGI, a Tracking Area Code (TAC) and all available Public Land Mobile Network (PLMN) IDs of the relevant neighbour cell using the newly discovered physical cell ID (namely, the ID of the cell B) as a parameter; therefore, the eNB needs to schedule an appropriate idle cycle to allow the UE to read the ECGI of the measured neighbour cell.

In step 204, the UE acquires the ECGI of the cell B by reading a Broadcast Channel (BCH).

In step 205, the UE reports the acquired ECGI of the cell B to the eNB of the cell A.

The eNB decides to add this neighbour cell relation in and can use the PCI and the ECGI to:
a, find a transport layer address of a new eNB;
b, update its NR list;
c, if necessary, establish an X2 interface connection with the new eNB.

For the second scenario:

Since the X2 interface is only defined in the E-UTRAN, the Inter-RAT situation is not concerned but only the inter-frequency situation is concerned here. The whole flow is similar to that in the first scenario and is not described in detail here.

If necessary in the inter-frequency scenario, the eNB can use the information detected by the UE to establish a new X2 interface connection.

In summary, the two methods in the related art have the following problems:

the method using the background configuration hands tedious work of configuring the neighbour eNB information to the operator; and the method for acquiring via the ANR makes the UE interact with the eNB very frequently for the neighbour cell detection, which increases air interface overhead.

SUMMARY OF THE INVENTION

The technical problem to be solved by the present invention is to provide a method and system for acquiring information of a neighbour eNB, to solve the problem in the prior art that it is relatively complicated to configure the information of the neighbour eNB manually in background and the air interface overhead will be increased when acquiring the information of the neighbour eNB by the ANR.

In order to solve the abovementioned technical problem, the present invention provides a method for acquiring information of a neighbour eNB, and the method comprises:

in a process of an evolved node B (eNB) establishing an S1 interface connection with a Mobility Management Entity (MME), the MME sends information of a global eNB ID and a tracking area identity (TAI) of the neighbour eNB of the eNB to the eNB;

the eNB receives and acquires the information of the global eNB ID and the TAI of the neighbour eNB.

The abovementioned method might also have the following feature:

in the process of the eNB establishing the S1 interface connection with the MME, the step of the MME sending the information of the global eNB ID and the TAI of the neighbour eNB of the eNB to the eNB comprises:

the eNB sending an S1 setup request message to the MME;

after the MME receives the S1 setup request message, returning an S1 setup response message to the eNB, wherein the S1 setup response message carries an information list of the global eNB ID and the TAI of the neighbour eNB of the eNB.

The abovementioned method might also have the following feature:

after the MME receives the S1 setup request message, the MME further sends an MME configuration update message to the neighbour eNB of the eNB, wherein the MME configuration update message carries information of a global eNB ID and a TAI of the eNB.

The abovementioned method might also have the following feature:

the eNB acquires the information of the global eNB ID and the TAI of the neighbour eNB according to the received S1 setup response message, constructs an eNB configuration transfer message for each neighbour eNB, and sends the eNB configuration transfer message to the MME;

after the eNB receives an MME configuration transfer message returned by the MME, the eNB acquires an IP address and a port number of an X2 interface connection of the corresponding neighbour eNB from the MME configuration transfer message.

The abovementioned method might also have the following feature:

after the eNB establishes the S1 interface connection with the MME, the MME sends an MME configuration update message to the eNB, wherein the MME configuration update message carries an information list of the global eNB ID and the TAI of the neighbour eNB of the eNB which newly establishes the S1 interface connection with the MME.

The abovementioned method might also have the following feature:

according to the received MME configuration update message, the eNB acquires the information of the global eNB ID and the TAI of the neighbour eNB, constructs an eNB configuration transfer message for each neighbour eNB, and sends the eNB configuration transfer message to the MME;

after the eNB receives an MME configuration transfer message returned by the MME, acquires an IP address and a port number of an X2 interface connection of the corresponding neighbour eNB from the MME configuration transfer message.

In order to solve the abovementioned technical problem, the present invention also provides a system for acquiring information of a neighbour eNB, comprising a Mobility Management Entity (MME) and an evolved Node B (eNB), wherein the MME is configured to send information of a global eNB ID and a tracking area identity (TAI) of the neighbour eNB of the eNB to the eNB in a process of establishing an S1 interface connection with the eNB; and the eNB is configured to receive and acquire the information of the global eNB ID and the TAI of the neighbour eNB.

The abovementioned system might also have the following feature:

the MME is further configured to, after receiving an S1 setup request message sent by the eNB, return an S1 setup response message to the eNB, wherein the S1 setup response message carries an information list of the global eNB ID and the TAI of the neighbour eNB of the eNB.

The abovementioned system might also have the following feature:

the MME is further configured to, after the eNB establishes the S1 interface connection with the MME, send an MME configuration update message to the eNB, wherein the MME configuration update message carries an information list of the global eNB ID and the TAI of the neighbour eNB of the eNB which newly establishes the S1 interface connection.

The abovementioned system might also have the following feature:

the eNB is further configured to, according to the information of the global eNB ID and the TAI of the neighbour eNB, construct an eNB configuration transfer message for each neighbour eNB, and send the eNB configuration transfer message to the MME; and after receiving an MME configuration transfer message returned by the MME, acquire an IP address and a port number of an X2 interface connection of the corresponding neighbour eNB from the MME configuration transfer message.

With the present invention, it is able to acquire the information of the neighbour eNB of the current eNB in the S1 interface setup (S1 SETUP) process; it can also acquire the information of the neighbour eNB via the MME configuration update message (MME CONFIGURATION UPDATE), and establish an X2 interface connection in time. Due to the setup of the X2 interface connection, it can acquire the information of neighbour cells and cells of the neighbour eNB. With the present invention, the operators are free from the tedious work of manually configuring the information of the neighbour eNB, and frequent interactions between the UE and the eNB for the neighbour cell detection can be reduced.

SPECIFIC EMBODIMENTS

In the present invention, two modes are applied to acquiring information of a neighbour eNB by an eNB.

Mode one, in the process of the eNB establishing an S1 interface connection with an MME, the MME sends the information of a global eNB ID and a TAI of the neighbour eNB of the eNB to the eNB;

Mode two, after the eNB establishes an S1 interface connection with an MME, the MME sends the information of a global eNB-ID and a TAI of the neighbour eNB that newly establishes the S1 interface connection with the MME to the eNB.

In the following, the present invention will be illustrated in detail in combination with accompanying drawings and embodiments.

Figure 1:
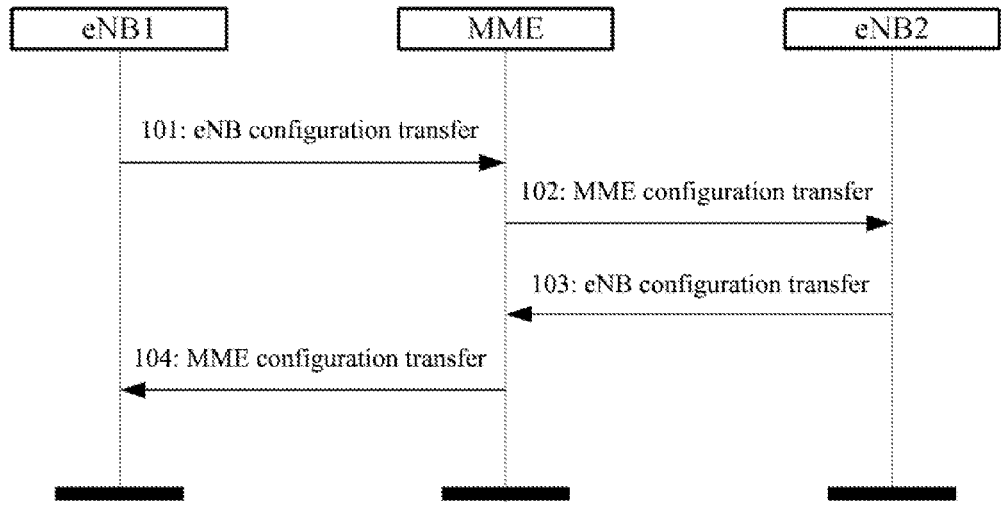
FIG. 1 is a schematic diagram of an eNB1 at a source side acquiring transmission address information of an eNB2 at a target side in the related art.
Figure 2:
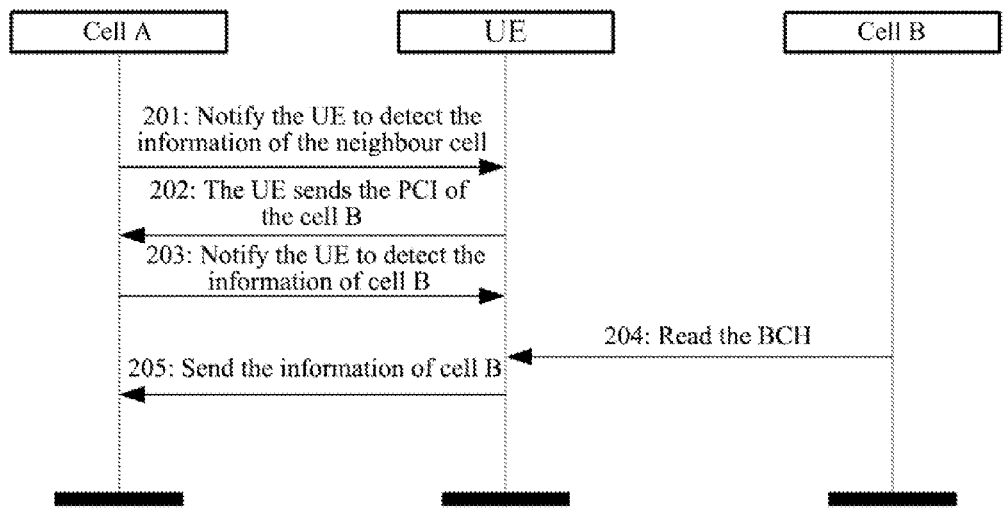
FIG. 2 is a schematic diagram of Intra-LTE/frequency automatic neighbour cell generation and optimization in the related art.
Figure 3:
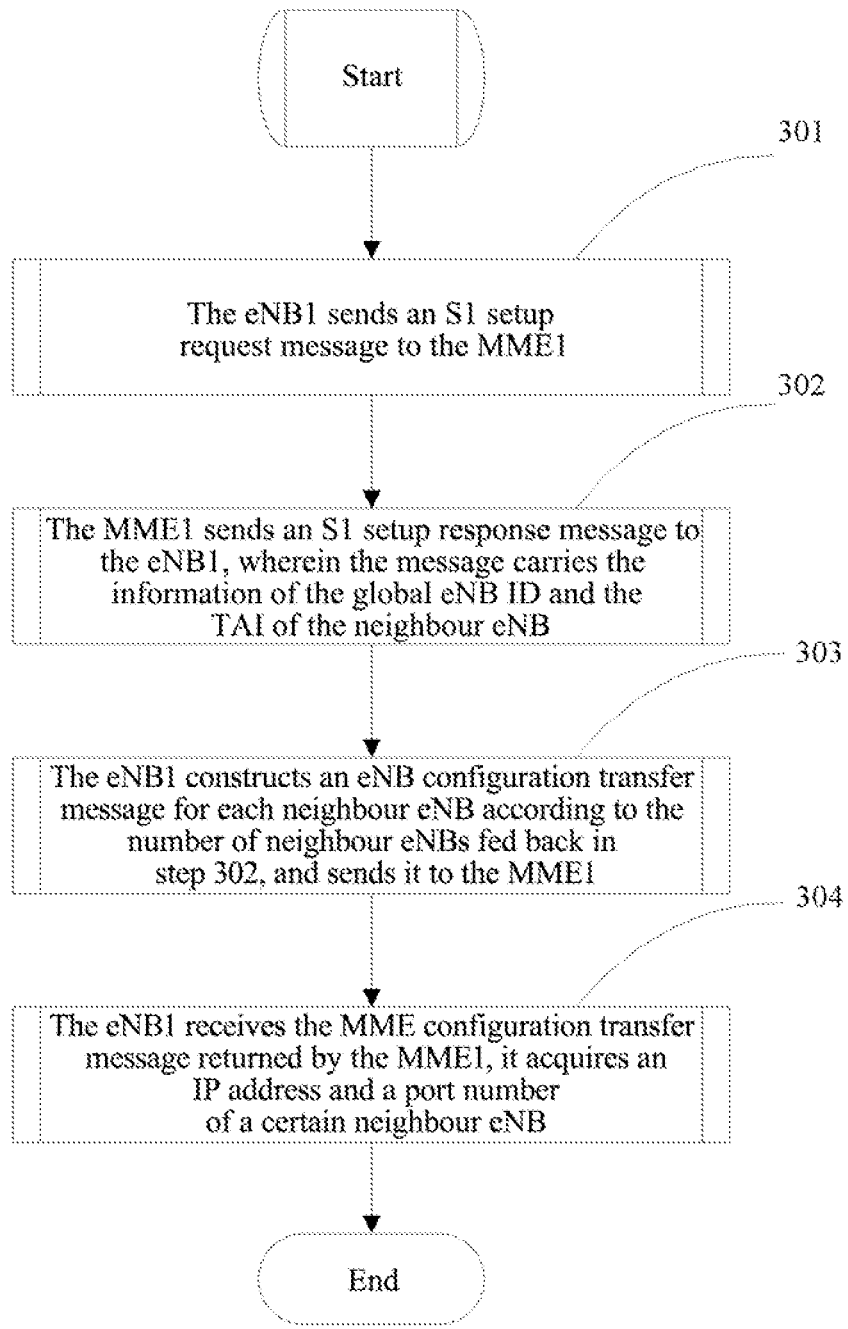
FIG. 3 is a flow chart of an eNB1 acquiring information of a neighbour eNB when establishing an S1 interface connection in accordance with an embodiment of the present invention.

As shown in FIG. 3, it is a flow of acquiring information of a global eNB ID and a TAI of a neighbour eNB in the process of an eNB1 establishing an S1 interface connection with an MME1, which comprises the following steps:

in step 301, the eNB1 sends an S1 setup request message (S1 SETUP REQUEST) to the MME1;

in step 302, after the MME1 receives the S1 setup request message from the eNB1, the MME1 returns an S1 setup response message (S1 SETUP RESPONSE) to the eNB1, wherein the S1 setup response message carries, except information cells included in the current protocol, an information list of the global eNB ID and the TAI of the neighbour eNB of the eNB1;

in this step, the MME1 sends an MME configuration update message (MME CONFIGURATION UPDATE) to the neighbour eNB of the eNB1, wherein the MME configuration update message carries the information of the global eNB ID and the TAI of the eNB1; thus the neighbour eNB of the eNB1 can acquire an IP address and a port number of an X2 interface connection of the eNB1 according to the information of the global eNB ID and the TAI of the eNB1;

in step 303, the eNB1 receives the S1 setup response message and acquires the information of the global eNB ID and the TAI of the neighbour eNB, constructs an eNB configuration transfer message for each neighbour eNB according to the number of neighbour eNBs fed back in step 302, and sends the message to the MME1;

in step 304, after the eNB1 receives the MME configuration transfer message returned by the MME1, it acquires an IP address and a port number of an X2 interface connection of a certain neighbour eNB from the MME configuration transfer message.

Figure 4:
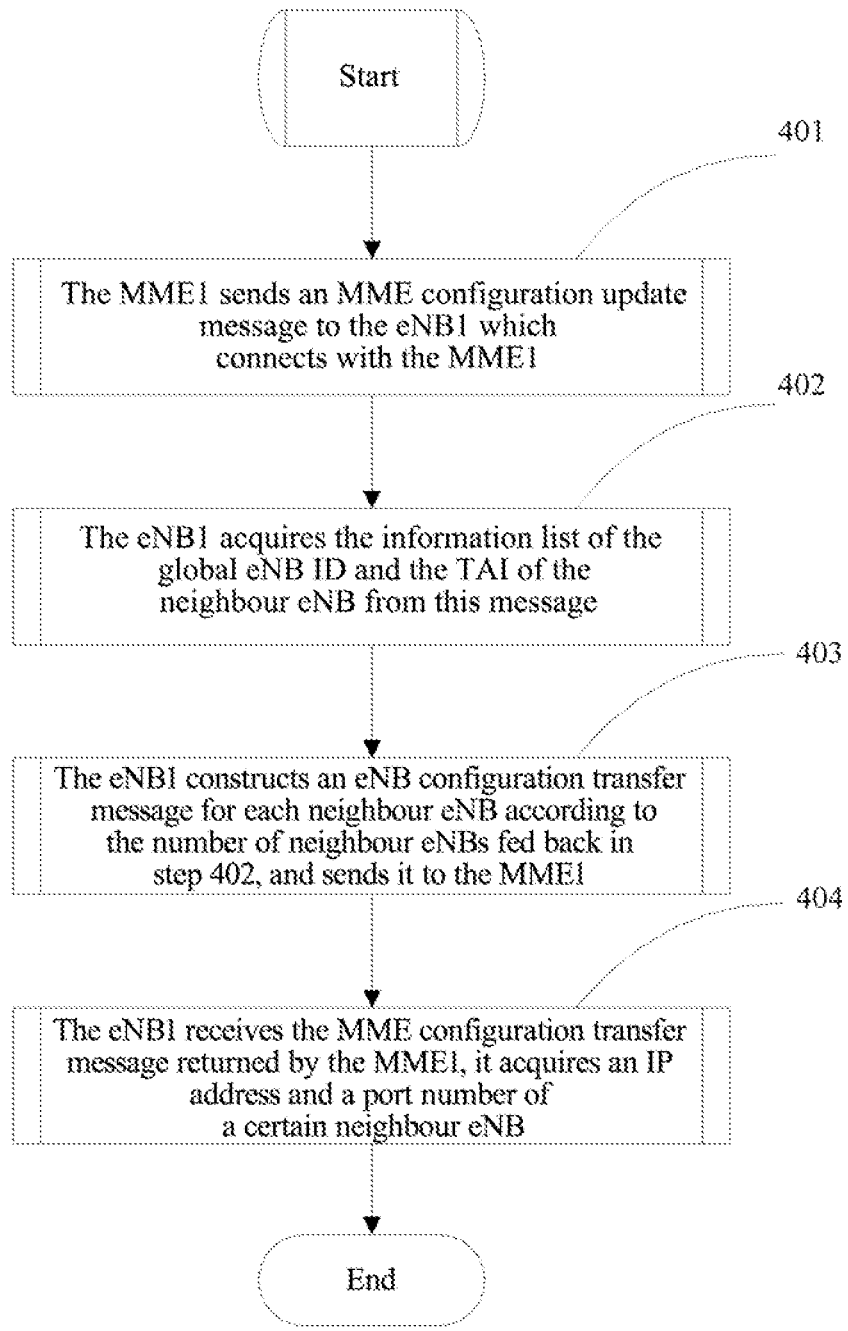
FIG. 4 is a flow chart of an eNB1 acquiring information of a neighbour eNB when receiving an MME configuration update message (MME CONFIGURATION UPDATE) in accordance with an embodiment of the present invention.

As shown in FIG. 4, it is a flow of acquiring information of a global eNB ID and a TAI of a neighbour eNB after an eNB1 establishing an S1 interface connection with an MME1, which comprises the following steps:

in step 401, the MME1 sends an MME configuration update message (MME CONFIGURATION UPDATE) to the eNB1, wherein this message carries an information list of the global eNB ID and the TAI of the neighbour eNB that newly establishes the S1 interface connection with the MME1;

since there is an eNB sending an S1 setup request message to the MME1 and this eNB is the neighbour eNB of the eNB1, the MME1 sends the abovementioned MME configuration update message to the eNB1;

in step 402, after the eNB1 receives the MME configuration update message, it acquires the information list of the global eNB ID and the TAI of the neighbour eNB;

in step 403, the eNB1 constructs an eNB configuration transfer message for each neighbour eNB according to the number of neighbour eNBs fed back in step 402, and sends it to the MME1;

in step 404, after the eNB1 receives the MME configuration transfer message returned by the MME1, it acquires an IP address and a port number of an X2 interface connection of a certain neighbour eNB from the MME configuration transfer message.

The system for acquiring information of a neighbour eNB in accordance with an embodiment of the present invention comprises an MME and an eNB.

The MME is used to send information of a global eNB ID and a TAI of a neighbour eNB of the eNB to the eNB in the process of establishing an S1 interface connection with the eNB; and the eNB is used to receive and acquire the information of the global eNB ID and the TAI of the neighbour eNB.

The MME is further used to, after receiving an S1 setup request message sent by the eNB, return an S1 setup response message to the eNB, wherein the S1 setup response message carries an information list of the global eNB ID and the TAI of the neighbour eNB of the eNB.

The MME is further used to send an MME configuration update message to the eNB after the eNB establishes an S1 interface connection with the MME, wherein, the MME configuration update message carries an information list of the global eNB ID and the TAI of the neighbour eNB of the eNB that newly establishes the S1 interface connection.

The eNB is further used to construct an eNB configuration transfer message for each neighbour eNB according to the information of the global eNB ID and the TAI of the neighbour eNB, and send it to the MME; and, after receiving the MME configuration transfer message returned by the MME, acquire an IP address and a port number of an X2 interface connection of the corresponding neighbour eNB from the MME configuration transfer message.

Certainly, the present invention can also have a variety of other embodiments, and for those skilled in the art, various corresponding modifications and variations can be made according to the present invention without departing from the spirit and essence of the present invention, but all these corresponding modifications and variations should belong to the protection scope of the appended claims of the present invention.

What is claimed is:

1. A method for acquiring neighbour E-UTRAN Node B (eNB) information, comprising:
   in a process of an eNB setting up an S1 interface connection with a Mobile Management Entity (MME), when the MME has received an ordinary S1 setup request from the eNB, the MME sending information of global eNB IDs and tracking area identities (TAIs) of neighbour eNBs of said eNB to the eNB, and said MME sending the information of the global eNB ID and the TAI of said eNB to said neighbour eNBs;
   the eNB receiving and acquiring the information of the global eNB IDs and the TAIs of the neighbour eNBs.

2. The method of claim 1, wherein,
   in the process of the eNB setting up the S1 interface connection with the MME, the step of the MME sending the information of the global eNB IDs and the TAIs of the neighbour eNBs of said eNB to the eNB comprises:
   after the MME receives the S1 setup request, the MME returning an S1 setup response to the eNB, and said S1 setup response carrying an information list of the global eNB IDs and the TAIs of the neighbour eNBs of said eNB.

3. The method of claim 2, wherein,
   the step of said MME sending the information of the global eNB ID and the TAI of said eNB to said neighbour eNBs comprises:

the MME sending a MME configuration update to the neighbour eNBs of the eNB, and the MME configuration update carrying the information of the global eNB ID and the TAI of the eNB.

4. The method of claim 2, wherein, the step of said eNB receiving and acquiring the information of the global eNB IDs and the TAIs of the neighbour eNBs comprises: said eNB acquiring the information of the global eNB IDs and the TAIs of the neighbour eNBs according to the received S1 setup response;

the method also comprises:

the eNB constructing an eNB configuration transfer for each neighbour eNB and sending the eNB configuration transfer to the MME;

after the eNB receives a MME configuration transfer returned by the MME, the eNB acquiring an IP address of an X2 interface connection of a corresponding neighbour eNB from the MME configuration transfer.

5. A method for acquiring neighbour E-UTRAN Node B (eNB) information, comprising:

after an eNB sets up an S1 interface connection with a Mobile Management Entity (MME), when the MME has received an ordinary S1 setup request from a neighbour eNB of said eNB, the MME sending a MME configuration update to the eNB, and the MME configuration update carrying an information list of global eNB ID and tracking area identity (TAI) of a-said neighbour eNB of said eNB.

6. The method of claim 5, further comprising according to the received MME configuration update, said eNB acquiring information of the global eNB ID and the TAI of the neighbour eNB, constructing an eNB configuration transfer for the neighbour eNB and sending the eNB configuration transfer to the MME;

after the eNB receives a MME configuration transfer returned by the MME, the eNB acquiring an IP address of an X2 interface connection of the neighbour eNB from the MME configuration transfer.

7. A Mobile Management Entity (MME) for acquiring neighbour E-UTRAN Node B (eNB) information, said MME being configured to:

send a MME configuration update to an eNB after the eNB sets up an S1 interface connection with the MME and when the MME has received an ordinary S1 setup request from a neighbour eNB of said eNB, wherein, the MME configuration update carries an information list of global eNB ID and tracking area identity (TAI) of a-said neighbour eNB of the eNB that newly sets up the S1 interface connection.

8. The MME of claim 7, wherein, said MME is also configured to:

receive an eNB configuration transfer that is constructed by the eNB for the neighbour eNB according to information of the global eNB ID and the TAI of the neighbour eNB and is sent to the MME;

return a MME configuration transfer to the eNB so that the eNB is able to acquire an IP address of an X2 interface connection of the neighbour eNB from the MME configuration transfer.

9. The method of claim 3, wherein, the step of said eNB receiving and acquiring the information of the global eNB IDs and the TAIs of the neighbour eNBs comprises: said eNB acquiring the information of the global eNB IDs and the TAIs of the neighbour eNBs according to the received S1 setup response;

the method also comprises:

the eNB constructing an eNB configuration transfer for each neighbour eNB and sending the eNB configuration transfer to the MME;

after the eNB receives a MME configuration transfer returned by the MME, the eNB acquiring an IP address of an X2 interface connection of a corresponding neighbour eNB from the MME configuration transfer.

* * * * *